(12) United States Patent
Maki et al.

(10) Patent No.: US 6,283,361 B1
(45) Date of Patent: Sep. 4, 2001

(54) GENERAL-PURPOSE JIG

(75) Inventors: Yuzuru Maki; Takahiko Arai; Shinichi Saito; Daisuke Kikuchi; Masahiro Ohkawara, all of Nakano-ku (JP)

(73) Assignee: Calsonic Corporation (JP)

( * ) Notice: Subject to any disclaimer, the term of this patent is extended or adjusted under 35 U.S.C. 154(b) by 0 days.

(21) Appl. No.: 09/222,152

(22) Filed: Dec. 29, 1998

(51) Int. Cl.$^7$ .................................................. B23K 31/02
(52) U.S. Cl. ........................ 228/212; 228/49.3; 228/44.5; 228/47.1; 269/43; 269/37
(58) Field of Search .................... 228/212, 49.3, 228/44.5, 47.1; 269/43, 37

(56) References Cited

U.S. PATENT DOCUMENTS

| | | | |
|---|---|---|---|
| 4,569,627 | * | 2/1986 | Simunovic ............................ 414/735 |
| 5,312,096 | * | 5/1994 | Jasper ..................................... 269/43 |
| 6,059,703 | * | 5/2000 | Heisel et al. ............................ 483/31 |

* cited by examiner

Primary Examiner—M. Alexandra Elve
(74) Attorney, Agent, or Firm—Rossi & Associates

(57) ABSTRACT

A general-purpose jig is provided which includes a base, a locational holding device mounted on the base and having a tripod robot that includes three expansion actuators, and a clamp attached to the locational holding device. The position of the clamp can be changed by changing the length of each of the expansion actuators, depending upon an object to be held, according to a command from a control device. The locational holding device may further include a three-axis rotary unit located between the clamp and the tripod robot. The posture of the clamp can be kept constant by controlling the three-axis rotary unit while the clamp is being moved by the expansion actuators.

14 Claims, 14 Drawing Sheets

GENERAL-PURPOSE JIG

BACKGROUND OF THE INVENTION

1. Field of the Invention

The present invention relates to a jig used for holding and fixing a part material during manufacturing of a part, or holding a part during inspection thereof, and in particular to such a jig that is generally used for a plurality of types of parts.

2. Description of the Prior Art

In manufacturing plants, jigs are used for holding part materials during assembling or welding of the parts, fixing for example.

When an exhaust pipe for an automobile is assembled by connecting two pipes to front and rear ends of a muffler by welding, for example, a jig is used for holding the pipes and the muffler in predetermined positions. In such a jig, clamps for holding appropriate portions of the muffler and the pipes are fixed to a base, so that the muffler and the pipes are positioned relative to each other according to a certain design.

To ensure sufficient high rigidity for supporting considerably heavy part materials, and avoid distortion during welding, the jig itself has a large weight, e.g., about 20 kg when it is used for a small-sized exhaust pipe.

In the case of exhaust pipes for automobiles, in particular, numerous different types of exhaust pipes are manufactured depending upon the types and versions of automobiles. In the real situation, jigs used in the manufacture of the exhaust pipes are specialized for respective types of products. Namely, a particular jig is used exclusively for each type of exhaust pipe. Thus, there has been a conventional problem that jigs having large weights must be handled each time the type of exhaust pipes manufactured on an assembly line is changed to another type, and heavy work is required for setting up the jigs.

Also, jigs used in the manufacture of products need to be stored for several years after shutting down the production line, for the purpose of production of spare parts. With an increase in the number of jigs stored, the storage space is increased, and increased time and labor are required for putting the jigs into and taking them out of the storage space. This has been a major problem in management of plants.

Similar problems concerning the known jigs are encountered in the case of jigs used for assembling other parts or inspecting those parts.

SUMMARY OF THE INVENTION

It is therefore an object of the present invention to provide a general-purpose jig which is able to easily provide a desired function of holding and fixing parts suitable for new types of products, without requiring heavy work upon changes of the type of parts to be assembled or inspected, and which can be stored in a significantly reduced storage space.

To accomplish the above object, the present invention provides a general-purpose jig comprising: a base; a locational holding device mounted on the base, and comprising a tripod robot that includes three expansion actuators; and a clamp attached to the locational holding device. In the jig, the position of the clamp can be changed by changing the length of each of the expansion actuators, depending upon an object to be held, according to a command from a control device.

In the general-purpose jig constructed as described above, when at least one of the expansion actuators of the tripod robot is expanded or contracted in response to a command from the control device, the clamp attached to the locational holding device is moved in three-dimensional space.

Since a plurality of locational holding devices can be mounted on the base, and the clamp of each holding device can be placed in a desired position by changing the length of each of the three expansion actuators, a single jig including the plural holding devices can handle a plurality of objects to be held.

In one preferred form of the invention, the tripod robot further includes a lower substrate, an upper substrate, and a rotation inhibiting mechanism provided between the lower substrate and the upper substrate for inhibiting torsional rotation of the lower and upper substrates relative to each other, and the three expansion actuators are located between the lower substrate and the upper substrate. Also, the locational holding device further comprises a three-axis rotary unit comprising elements that can be rotated about three axes that intersect at right angles with each other, and the three-axis rotary unit operates according to a command from the control device. With this arrangement, the position of the clamp can be controlled as desired, and the angle of the clamp can be also controlled as desired by means of the three-axis rotary unit provided between the tripod robot and the clamp.

The rotation inhibiting mechanism may include two parallel sleeves that are connected to the lower substrate with two degrees of freedom and spaced apart from each other by a given distance, and two slide rods that are fixed to the upper substrate and extend in parallel with each other, such that the two slide rods are guided by the sleeves. Thus, the rotation inhibiting mechanism has a simple structure including the parallel sleeves connected to the lower substrate, and the slide rods fixed to the upper substrate and received in the sleeves. Further, since the slide rods are slidable along the parallel sleeves, the rotation inhibiting mechanism can deal with changes in the distance between the lower substrate and the upper substrate due to expansion and contraction of the expansion actuators.

In another preferred form of the invention, the expansion actuators of the tripod robot and the three-axis rotary unit are driven by stepping motors or servo motors, and the control device includes computing means for calculating a displacement of each of the expansions actuators and the three-axis rotary unit, and controls a rotating angle of a corresponding one of the stepping motors or servo motors, according to the displacement. By controlling the rotating angles of the stepping motors or servo motors, the expansion actuators and three-axis rotary unit can be easily and surely positioned to achieve respective displacements calculated by the computing means.

The control device may control the three-axis rotary unit while the tripod robot is being operated to move the clamp or after the movement of the clamp, so that the clamp maintains a predetermined or constant posture. This makes it easy to perform teaching operations on the control device.

The control device may further include manual operating means for operating the tripod robot and the three-axis rotary unit as desired, and storage means, and the computing means may calculate displacement data or related position data of the tripod robot or the three-axis rotary unit that is operated by the manual operating means, and store the displacement data or related position data into the storage means. This arrangement allows teaching operations to be performed automatically.

Preferably, the control device further includes a display on which the current displacement data or related position data of the tripod robot or three-axis rotary unit is displayed. This allows the user to confirm the displacement or position data set in the teaching mode.

BRIEF DESCRIPTION OF THE DRAWINGS

The invention will be described in greater detail with reference to a certain preferred embodiment thereof and the accompanying drawings, wherein.

DETAILED DESCRIPTION OF THE PREFERRED EMBODIMENT

One preferred embodiment of the present invention will be described with reference to the drawings.

Figure 1:
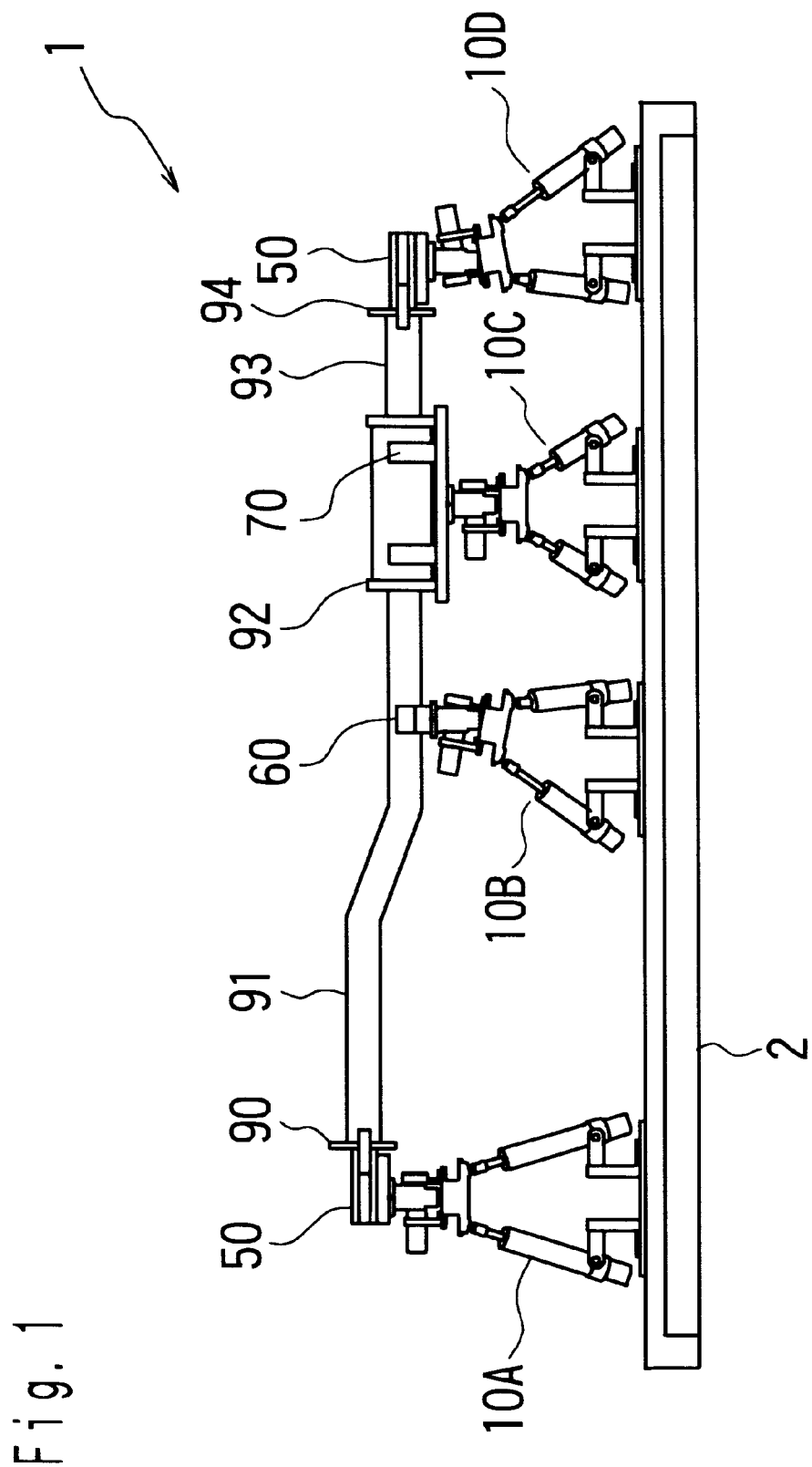
FIG. 1 is a view showing the whole construction of one embodiment of the present invention.

FIG. 1 shows the whole construction of a general-purpose jig according to one embodiment of the present invention, which is used for assembling an exhaust pipe of an automobile.

The jig 1 for assembling an exhaust pipe is constructed such that a plurality of locational holding devices each including a tripod robot are mounted on a base 2. In this embodiment, the first to fourth locational holding devices 10 (10A, 10B, 10C, 10D) are provided, and clamps 50, 60, 70, are respectively attached to the holding devices 10A, 10B, 10C, 10D.

The clamp 50 is attached to the first locational portion of the base 2, and holds a flange 90 provided at the front end of a front pipe 91. Another clamp 50 is attached to the fourth locational holding device 10D disposed on the other end portion of the base 2, and holds a flange 94 provided at the rear end of a rear pipe 93.

The clamp 60 that is attached to the second locational holding device 10B holds a middle portion of the front pipe 91, and the clamp 70 that is attached to the third locational holding device 10C holds a muffler 92. The rear end of the front pipe 91 and the front end of the rear pipe 93 are inserted through the front wall and rear wall of the muffler 92, respectively.

The clamps 50, 60, 70 used in this embodiment are selected from different types of clamps, depending upon the part materials and locations thereof to be held by the respective clamps. Each of the locational holding devices 10 locates a corresponding one of the clamps 50, 60, 70 at a certain position with a certain angle in three-dimensional space.

While the front pipe 91, muffler 92, rear pipe 93 and the flanges 90, 94 are held in predetermined positional relationships with each other in three-dimensional space in the above manner, joining portions of these parts 91, 92, 93, 90, 94 are welded to each other by an automatic welding machine (not illustrated), so as to produce an exhaust pipe.

The structure of each of the locational holding device 10 will be now described in detail.

Figure 2:
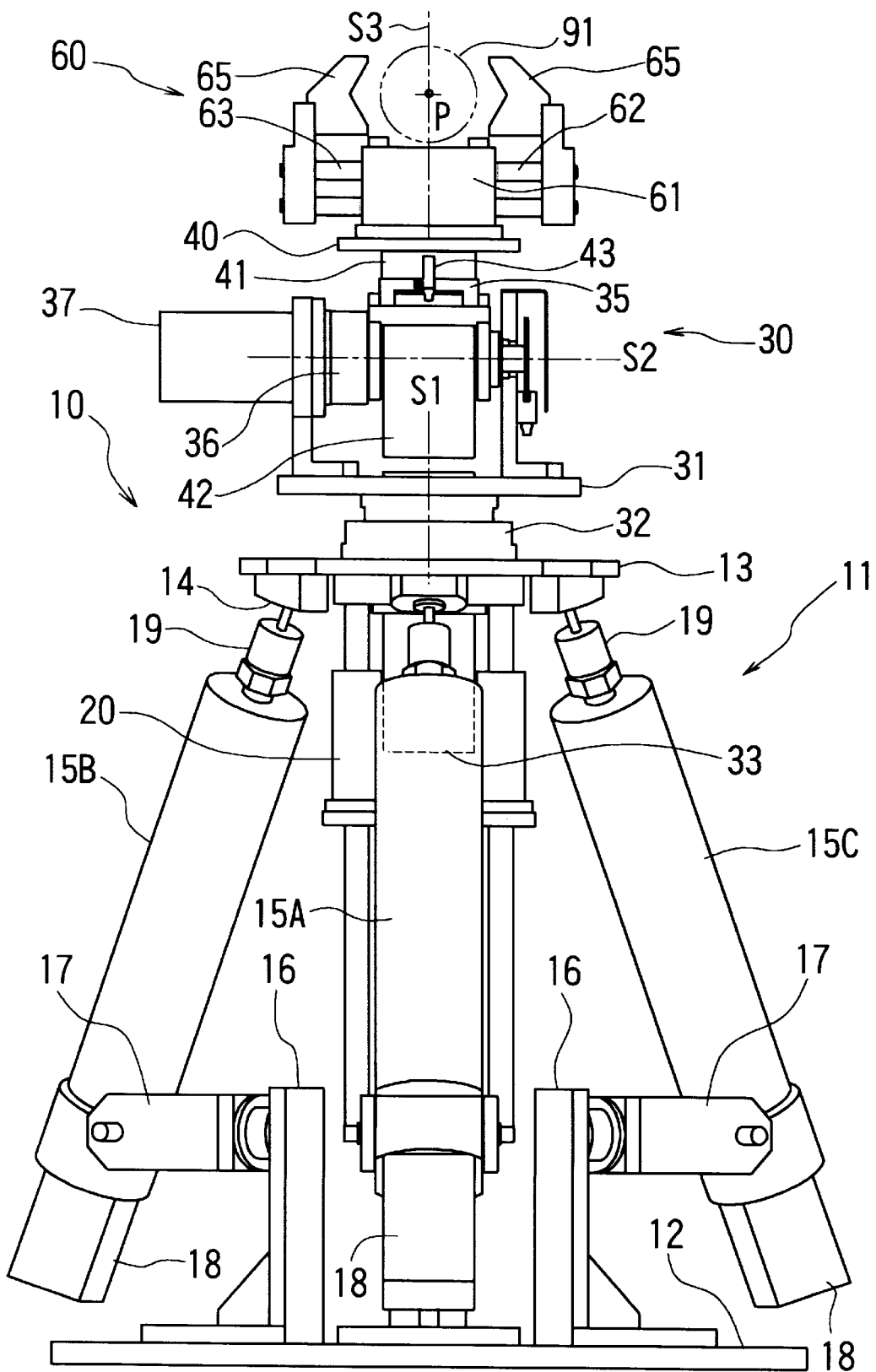
FIG. 2 is a front view showing a locational holding device.
Figure 3:
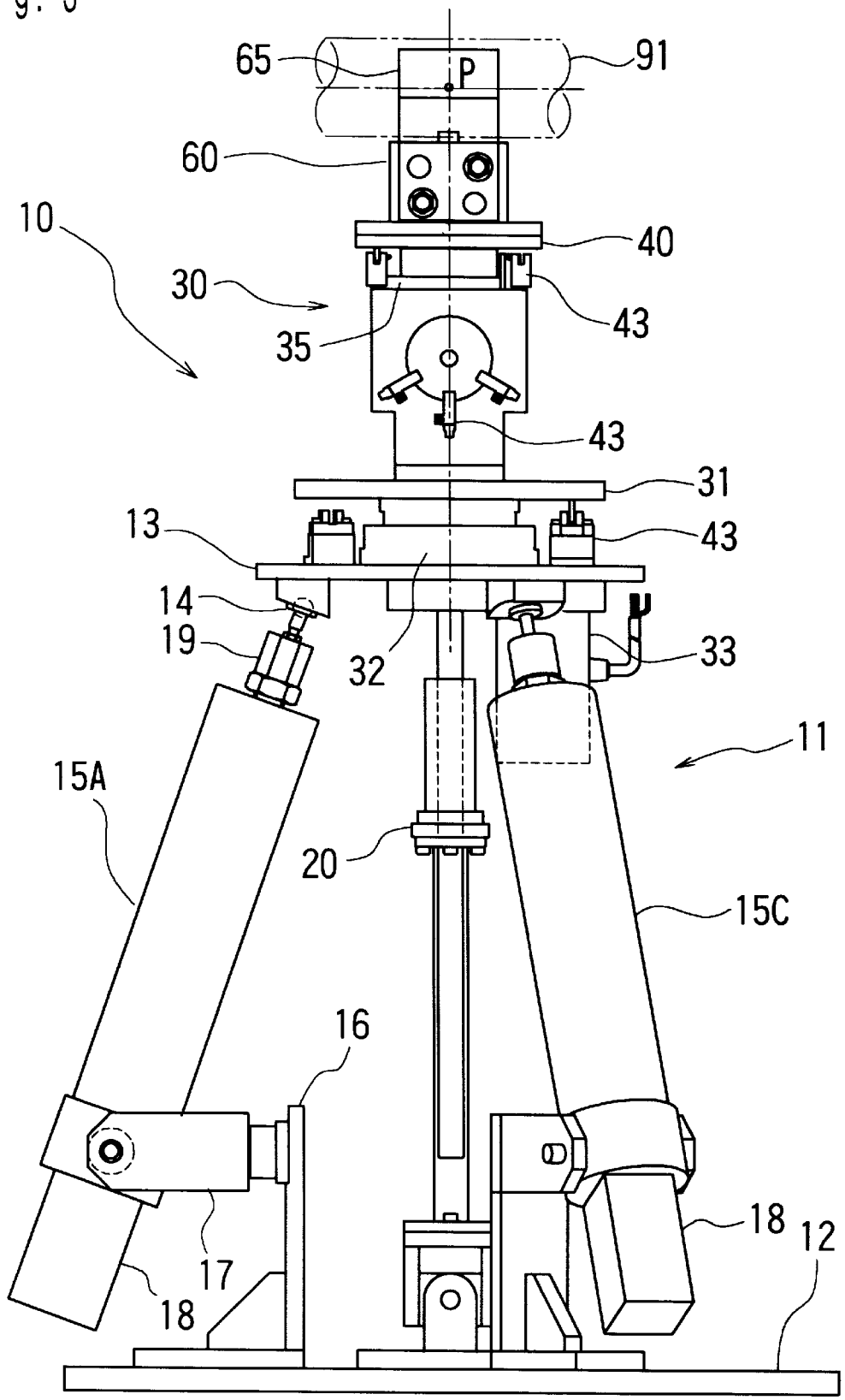
FIG. 3 is a side view showing the locational holding device.
Figure 4:
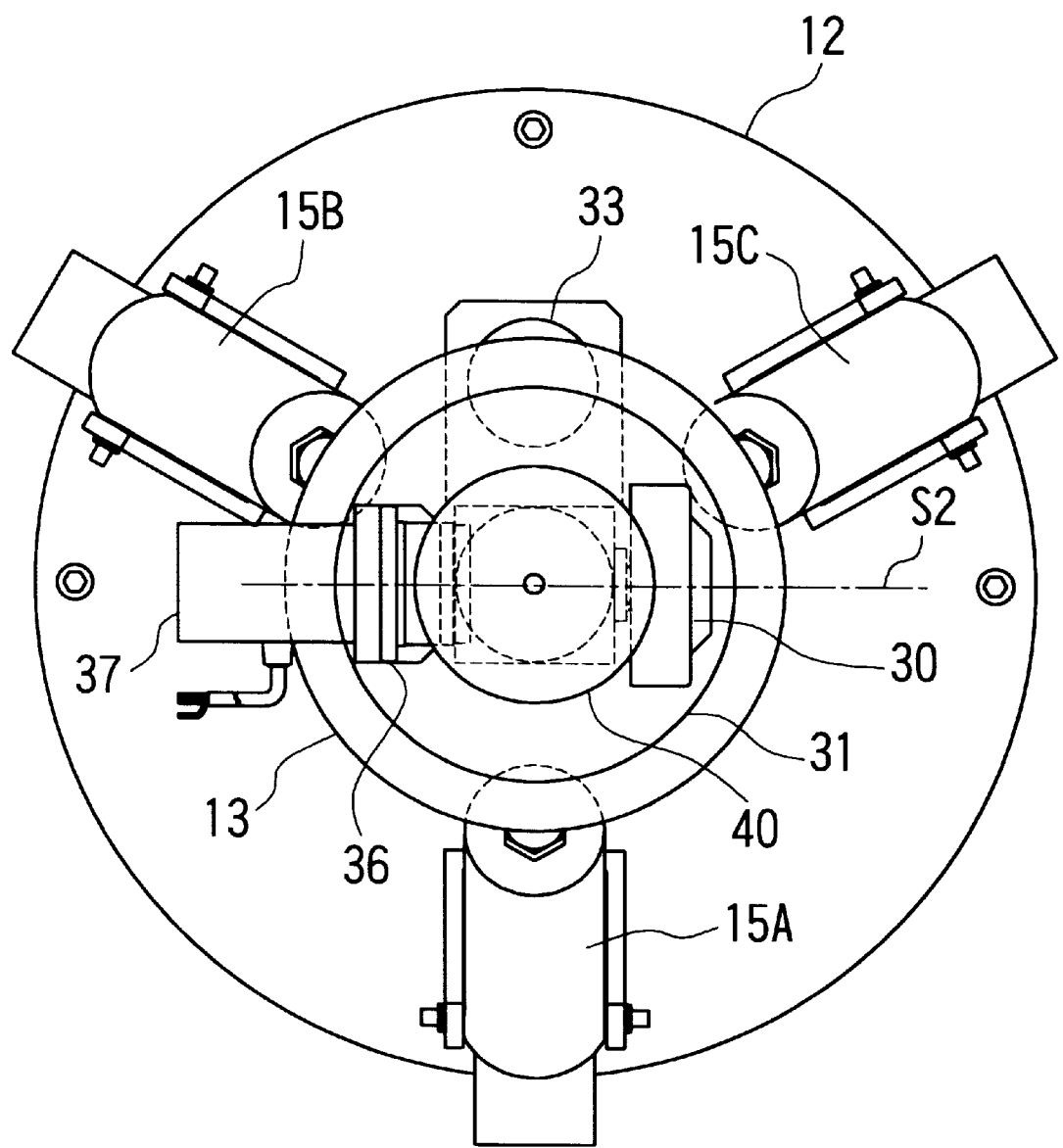
FIG. 4 is a plan view showing the locational holding device.

FIG. 2 and FIG. 3 are front view and side view showing the locational holding device 10 to which the clamp 60 is attached, and FIG. 4 is a plan view of the locational holding device 10 from which the clamp is removed.

The locational holding device 10 generally consists of a tripod robot 11 and a three-axis rotary unit 30. The tripod robot 11 includes a lower substrate 12 having a circular shape, an upper substrate 13 similarly having a circular shape, and three expansion actuators 15 (15A, 15B, 15C) whose lower end portions are respectively supported, via rotating yokes 17, by three brackets 16 provided on the lower substrate 12. The three brackets 16 are spaced uniformly or equiangularly from each other around the center of the lower substrate 12.

The upper end portions of the three expansion actuators 15A, 15B, 15C are supported at equally spaced positions about the center of the upper substrate 13. Also, a rotation inhibiting mechanism 20 is provided between the lower substrate 12 and the upper substrate 13.

A rotary axis of the rotating yoke 17 with respect to the bracket 16 and a rotary axis of the yoke 17 with respect to the expansion actuator 15 cross each other at right angles, such that each expansion actuator 15 is movable in desired directions in three-dimensional space, with two degrees of freedom.

The expansion actuator 15 is provided at its lower end with a drive motor 18 that consists of a stepping motor, and its upper rod 19 is advanced and retracted in the longitudinal direction of the actuator 15 by means of a rotary-linear motion converting mechanism (not illustrated) using a known ball-nut structure. A desired amount of extension of the rod 19 can be achieved by applying a suitable drive signal to control the angle of rotation of the drive motor 18. Although not illustrated in the figures, each expansion actuator 15 is provided with a limit switch that indicates a reference point based on which the rod 19 is advanced and retracted. The stepping motor incorporates a brake mechanism adapted for increasing the force to retain the position of the rod 19 after it is advanced or retracted.

The upper end of the rod 19 is coupled to the upper substrate 13 via a ball joint 14, with three degrees of freedom. The interval of support points on the side of the lower substrate 12 on which the expansion actuators 15 are supported by the brackets 16 is set to be larger than that of support points on the side of the upper substrate 13.

Figure 5A:
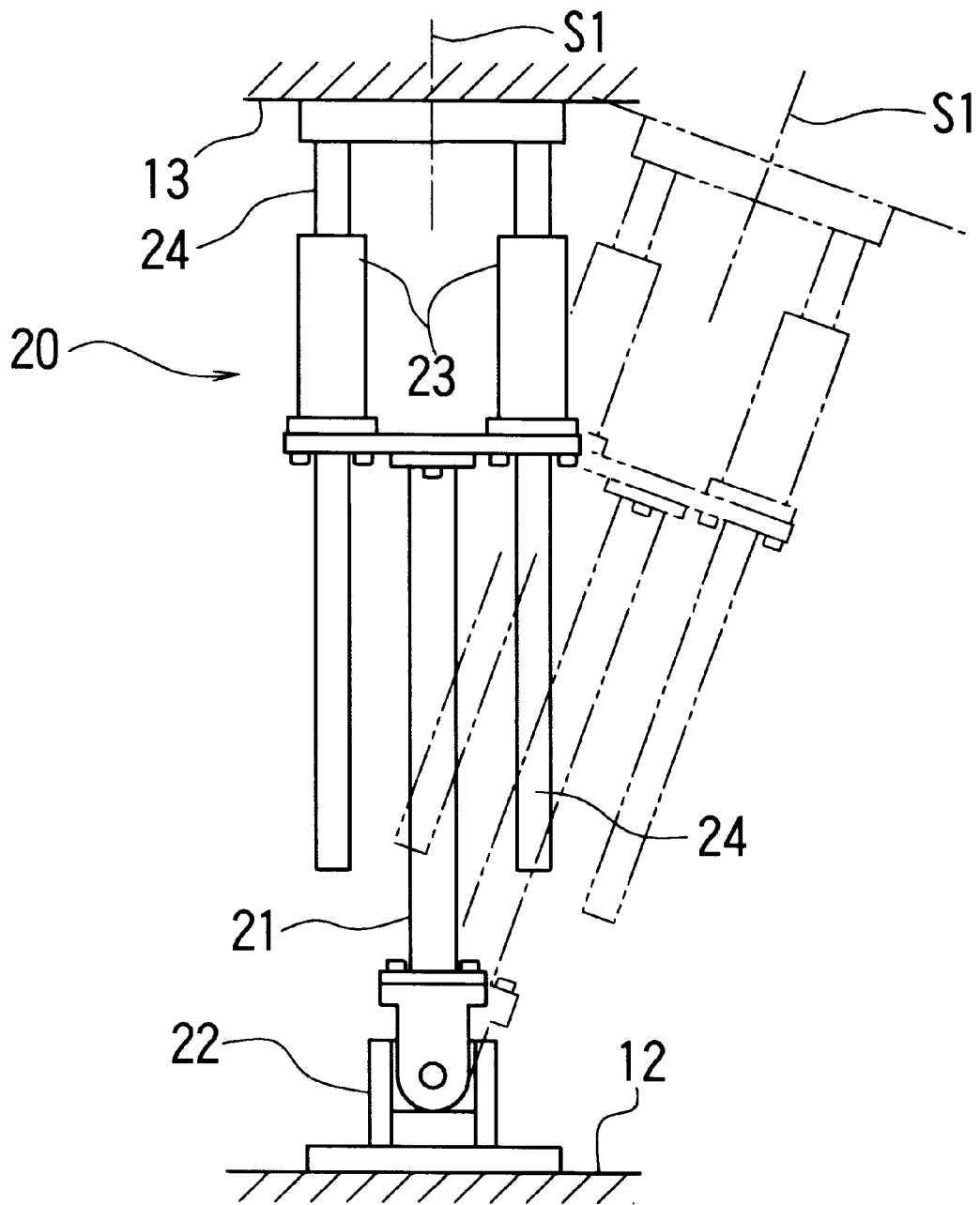
FIG. 5A is a front view showing the structure of a rotation inhibiting mechanism.
Figure 5B:
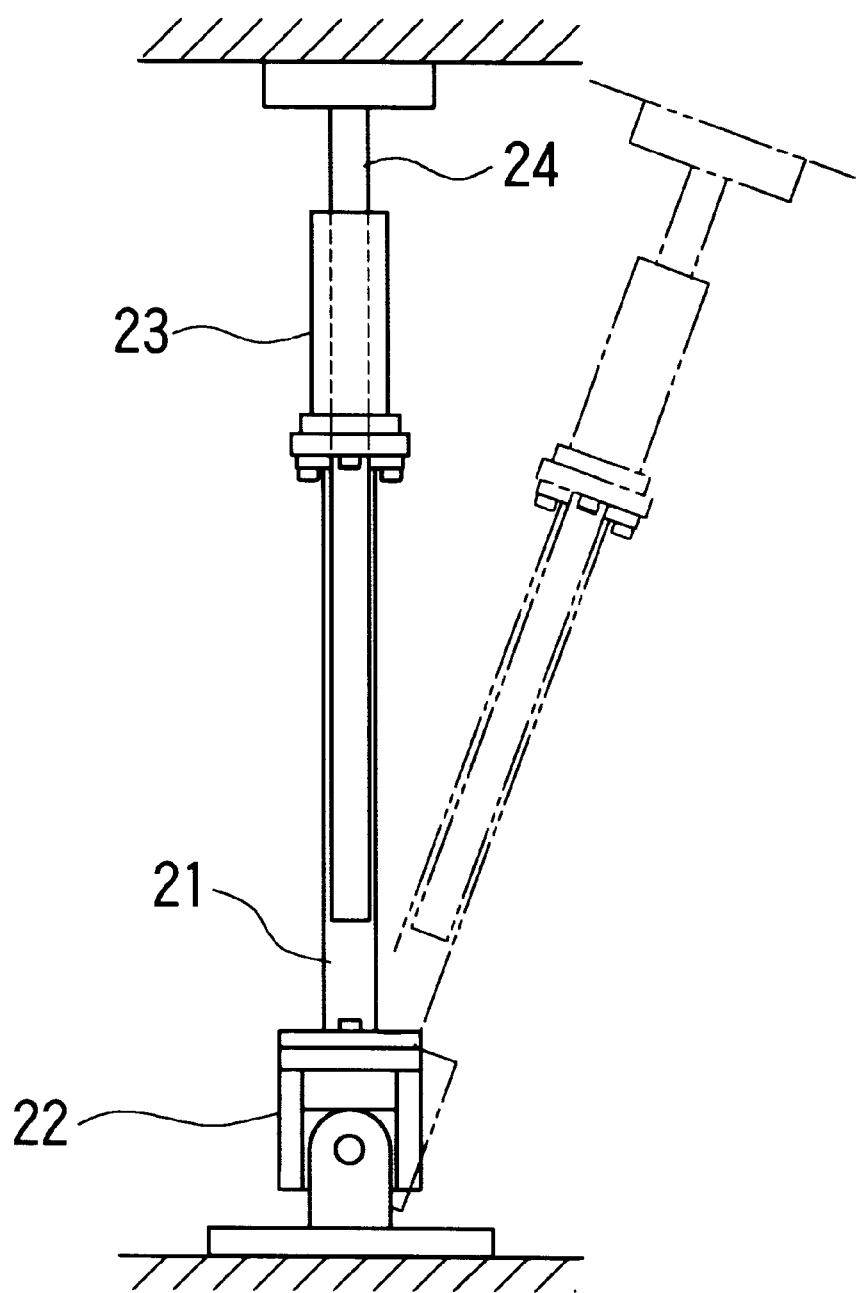
FIG. 5B is a side view showing the structure of a rotation inhibiting mechanism.

FIGS. 5A and 5B are front view and side view, respectively, showing the structure of the rotation inhibiting mechanism 20. The rotation inhibiting mechanism 20 generally consists of a swing rod 21 whose lower end is coupled to a central portion of the lower substrate 12 via a two degrees of freedom universal joint 22, and two slide rods 24 that are fixed at their upper ends to the upper substrate 13 and extend downward from the substrate 13. Two sleeves 23 that are spaced apart from each other are fixed to the upper end portion of the swing rod 21. The mutually spaced sleeves 23 extend in parallel with the swing rod 21, and receive the slide rods 24 extending from the upper substrate 13 such that the rods 24 are slidable within the sleeves 23. With this arrangement, the rotation inhibiting mechanism 20, and the upper substrate 13 connected to the mechanism 20 are freely movable in a desired direction in three dimensional space. When a torsional force is applied to the mechanism, however, the upper substrate 13 is inhibited from rotating relative to the lower substrate 12.

With the above arrangement, the tripod robot 11 is able to move the upper substrate 13 to a desired position, within a limited range that is determined by the amounts of expansion of the three expansion actuators 15A, 15B, 15C that are driven by the respective drive motors 18.

If at least one of the three expansion actuators 15A, 15B, 15C is expanded or contracted while the upper substrate 13 is held in a horizontal state with the actuators 15A, 15B, 15C having the same length as shown in FIG. 2 and FIG. 3, the upper substrate 13 is moved, and may be inclined as shown in FIG. 5 by way of example.

In the present embodiment, therefore, the three-axis rotary unit 30 is attached onto the upper substrate 13, as shown in FIG. 2, FIG. 3 and FIG. 4. The rotary unit 30 is able to hold a third plate (as described later) as a clamp mounting plate in the horizontal position even after the upper substrate 13 is moved, and also able to incline the third plate in a desired direction.

The three-axis rotary unit 30 includes a first plate 31, second plate 35, and third plate 40 that are driven by respective control motors. The first plate 31 is rotatable within a plane parallel with the upper substrate 13, about a center axis S1 (first axis, as shown in FIG. 5A) of the upper substrate 13 as a rotary axis, by means of a first drive portion 32 including a first control motor 33.

The second plate 35 is provided such that it is offset from the second axis S2 that intersects with the first axis Si at right angles. The third axis S3 that passes the center of the second plate 35 and extends in the radial direction from the second axis S2 is rotatable about the second axis S2 by means of a second drive portion 36 including a second control motor 33.

The third plate 40 is rotatable about the third axis S3 within a plane that is parallel with the second plate 35, by means of a third drive portion 41 including a third control motor 42. The first axis S1, second axis S2 and the third axis S3 intersect with each other at the same point.

Each of the first, second and third control motors 33, 37, 42 consists of a steeping motor. When the upper substrate 13 is inclined, the first and second plates 31, 35 can be rotated in a controlled manner, so as to bring the third plate 40 into a horizontal posture or other desired posture. These stepping motors also incorporate brake mechanisms for increasing the force for retaining the plates in the respective positions after they are rotated.

Each of the first plate 31, second plate 35 and the third plate 40 is provided with a limit switch 43 that indicates the initial position (zero point) of the rotating plate, and the limit of rotation of the plate.

Figure 6:
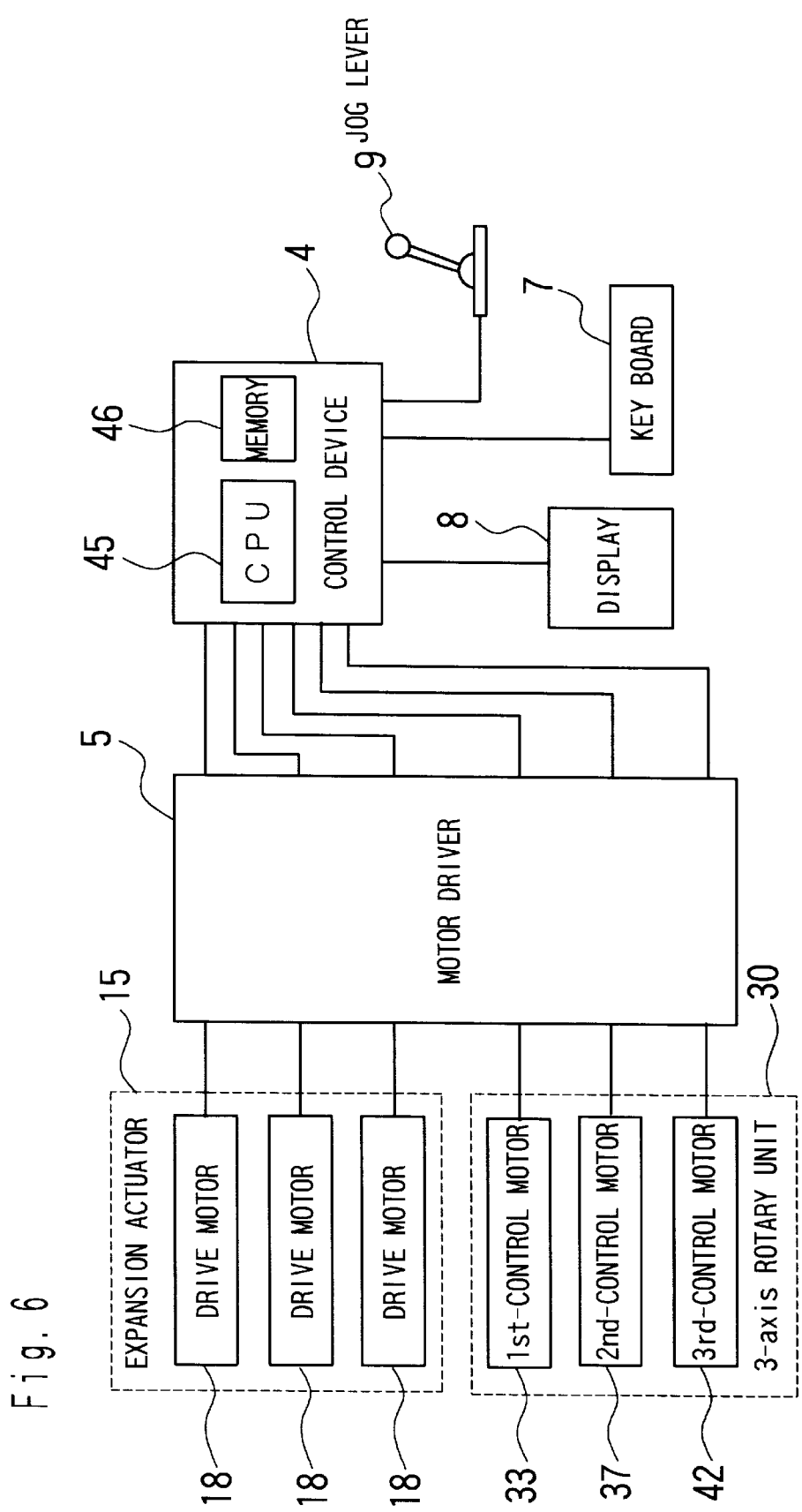
FIG. 6 is a diagram showing a control system of the embodiment of FIG. 1.

As shown in FIG. 6, the drive motors 18 of the expansion actuators 15 and the first, second and third control motors 33, 37, 42 of the three-axis rotary unit 30 are driven in response to control commands applied thereto from a control device 4 through a motor driver 5. Thus, each of the motors 18, 33, 37, 42 is rotated by an angle specified by the control command, so as to provide accurately controlled amounts of expansion of the expansion actuators 15, and accurately controlled angles of rotation of the respective plates of the three-axis rotary unit 30.

The third plate 40 of the three-axis rotary unit 30 provides a clamp mounting plate, and the clamp 60 is attached to the upper surface of the third plate 40.

The control device 4 includes a CPU 45 and an internal memory 46, and a keyboard 7 as an input device and a display 8, such as LCD, are connected to the control device 4.

Figure 7:
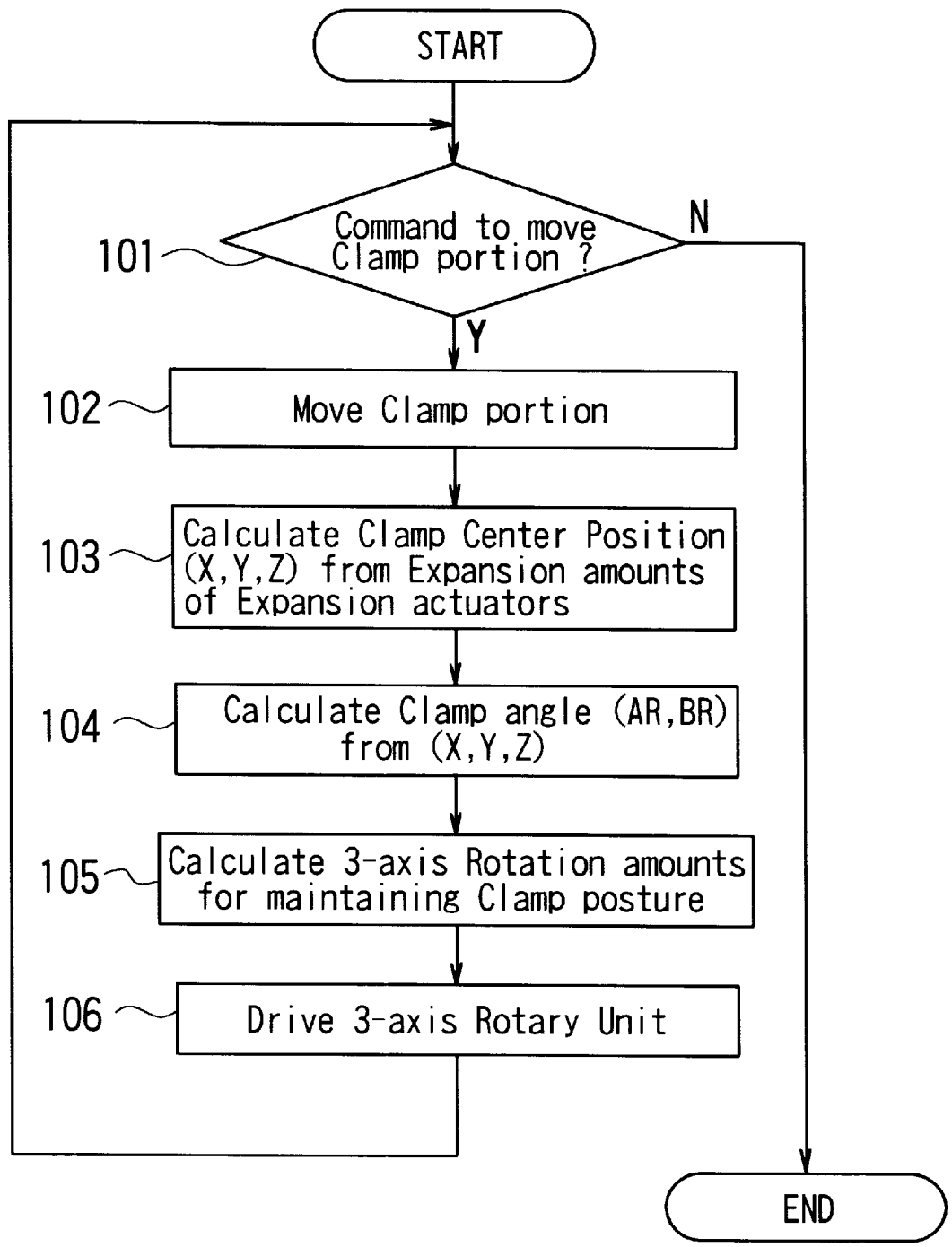
FIG. 7 is a flowchart showing the flow of control when the clamp is moved while its posture is being maintained.

In the locational positioning device 10 constructed as described above, when the clamp 60 attached to the clamp mounting plate (third plate 40) is moved by expanding or contracting the expansion actuator(s) 15, the control unit 4 operates the three-axis rotary unit 30 according to the control flow as shown in FIG. 7, so as to control the locational position device so that the posture of the clamp mounting plate is held constant.

Initially, step 101 is executed to determine whether a command to move the clamp portion is generated. This determination is made by checking if the keyboard 7 of the control device 4 is operated, or a JOG lever 9 connected to the control device 4 is manipulated.

If the command to move the clamp portion is generated, step 102 is then executed to drive the drive motors so as to expand or contract the expansion actuators 15A, 15B, 15C, thereby to move the clamp portion.

In the next step 103, the position coordinates (X, Y, Z) of the clamp center P are calculated from the amounts of expansion of the respective expansion actuators 15A, 15B, 15C.

Step 104 is then executed to calculate the angle (AR, BR) of the third plate 40 of the three-axis rotary unit 30 from the position coordinates (X, Y, Z), where AR represents the angle formed by the horizontal plane and the third axis S3, and BR represents the angle of the plate 40 about the third axis S3 as measured from a reference position.

Step 105 is then executed to calculate the amounts of rotation of the three-axis rotary unit 4 about three axes (S1, S2, S3), which are required for bringing the third plate 40 with the angle (AR, BR), back to the original posture before expansion of the actuators.

In step 106, the first, second and third control motors 33, 37, 42 are actuated so as to rotate the three axes of the three-axis rotary unit 30 by the amounts calculated in step 105.

The control flow then returns to step 101, to check the presence of a command to move the clamp portion. If the center position of the clamp has not reached the target position, and the JOG lever 9, or the like, is still being operated, the above-described control flow is repeated.

If step 101 determines that the JOG lever 9, or the like, is not operated, and no command to move the clamp portion is generated, the control is terminated.

Since the clamp is moved while maintaining a constant posture in the manner as described above, "teaching" as described later can be considerably easily performed.

To the contrary, the position and posture of the clamp can be controlled by entering data of the position coordinates (X, Y, Z) of the clamp center P relative to the reference position coordinates (0, 0, 0) and the angle (AR, BR) of the clamp mounting plate (third plate 40), into the control device 4, so that the device 4 can calculate the amounts of expansion of the respective expansion actuators 15A, 15B, 15C and the amounts of rotation of the three axes of the three-axis rotary unit 30, based on which the drive motors 18 and control motors 33, 37, 42 are driven. This makes it easy to set the position and posture of the clamp through input of CAD data, for example.

The calculations for conversion among the position coordinates of the clamp center P, angle of clamp mounting plate, amounts of expansion of expansion actuators, and the amounts of rotation of the three axes of the three-axis rotary unit are merely geometric calculations. Thus, any program having certain steps in a desired order may be produced.

Next, the calculations for the above conversion will be briefly explained.

Figure 8:
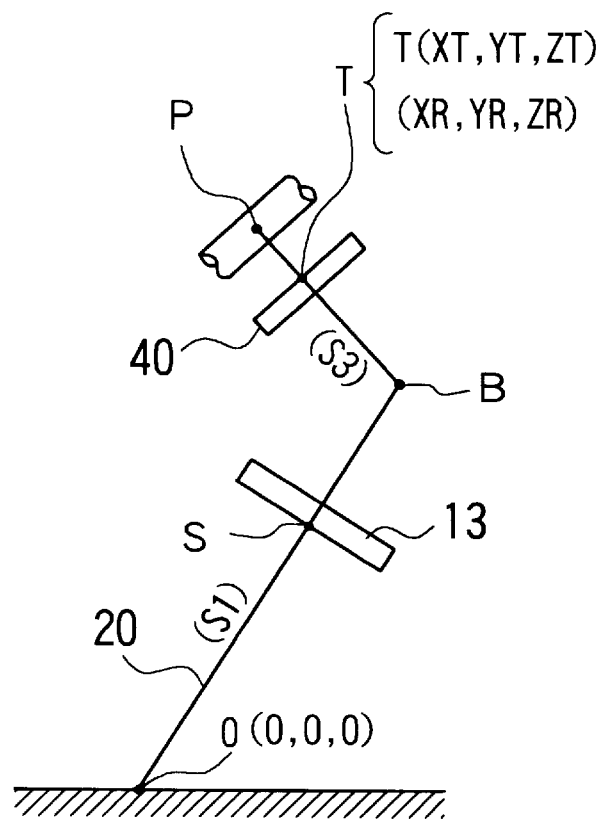
FIG. 8 is a view showing the relationships among coordinate points used for conversion calculations.

As shown in FIG. 8, if the position of the universal joint located at the lower end of the rotation inhibiting mechanism 70 is taken as the reference position having origin coordinates (0, 0, 0), a straight line connects the origin O with point B at which the first axis S1 extending through the upper substrate 13 intersects with the second axis S2. In FIG. 8, the position of the point B does not change even if the first axis S1 is rotated by the first drive portion 32.

The third axis S3 extends from the point B while rotating about the second axis S2 by a certain angle, and the third plate 40 and the clamp center P as a central point of work are arranged along a straight line or third-axis S3 that extends from the point B. The positions of points B, P and point T of the third plate 40 do not change even if the third axis S3 is rotated by the third drive portion 41.

The coordinates of the third plate or clamp mounting plate are represented by T (XT, YT, ZT), and it's angle is represented by (XR, YR, ZR) on the basis of each coordinate axis, instead of (AR, BR). Here, ZR is an angle of rotation about vector v as described later.

Once the coordinates and angle of the clamp center P are determined, the coordinates T (XT, YT, ZT) and angle (XR, YR, ZR) of the clamp mounting plate are uniquely obtained.

Figure 9:
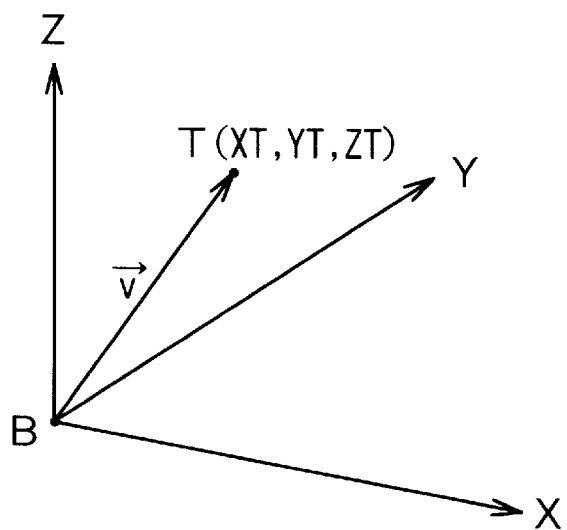
FIG. 9 is a vector diagram showing the posture of the third axis.
Figure 10:
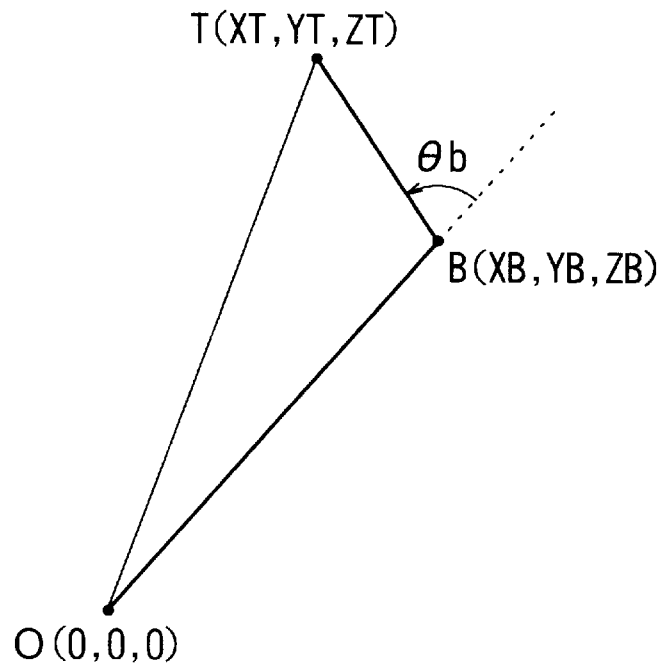
FIG. 10 is a view useful in explaining calculations for obtaining the operating angle of the second axis.

If the vector from point B to point T (XT, YT, ZT) is represented by v (vx, vy, vz), as shown in FIG. 9, the following relationships are established.

$\tan XR = vx/vz$ $\tan YR = vy/vz$ $(vx)^2+(vy)^2+(vz)^2=|v|^2$

Accordingly, the coordinates B (XB, YB, ZB) of point B are obtained by $XB=XT-vx$ $YB=YT-vy$ $ZB=ZT-vz$ Since point S of the upper substrate 13 lies on the straight line connecting the origin O and point B, its coordinates S (XS, YS, ZS) are obtained according to the proportional relationship once the coordinates of point B are obtained. The point S lies on the plane that contains three ball joints 14.

Once the coordinates of point B are obtained, the length of the segment BO connecting the origin O and point B and its angle are determined, and therefore the operating angle θb of the second angle S2 at point B can be obtained as follows, applying the law of cosines to triangle OBT.

Where 2S=OT+OB+BT, $\theta b = 180° - 2\sin^{-1}((S-OB)\cdot(S-BT)/(OB\cdot BT))^{1/2}$ Next, in the plane that passes through point T and intersects at right angles with an extension of the segment BO at point B', the operating angle θs of the first axis S1 is obtained from the angle formed by the vector from point B' to point T and the vector before the rotating of the first axis S1.

Figure 11:
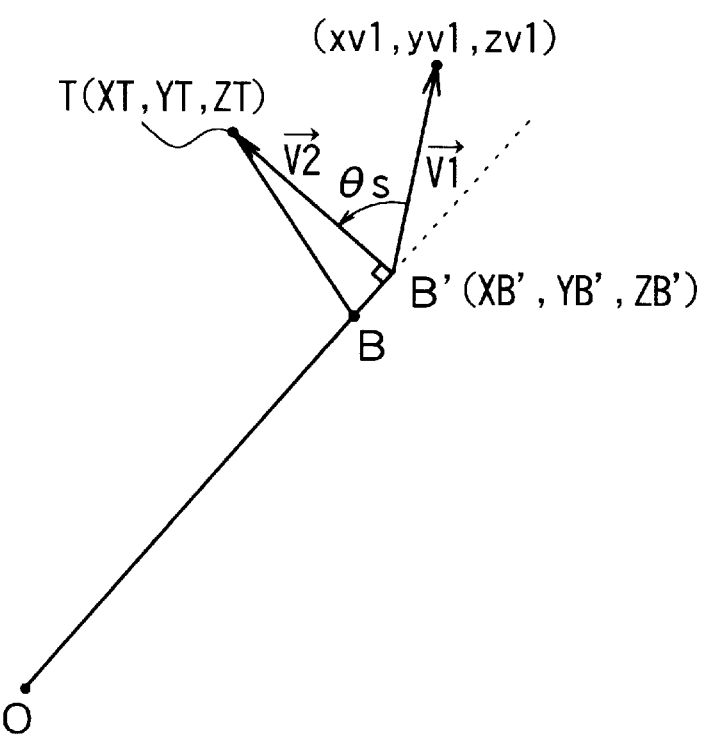
FIG. 11 is a view useful in explaining calculations for obtaining the operating angle of the first axis.

As shown in FIG. 11, where the coordinates of point B' are B' (XB', TB', ZB'), and the angle of inclination of the rotation inhibiting mechanism in the Y axis direction is represented by θ2, the vector before rotation of the first axis S1 as represented by V1 (xv1, yv1, zv1) is obtained as follows, and its magnitude V1 is 1.

$xv1=XB'$ $yv1=YB'+\cos \theta 2$ $zv1=ZB'-\sin \theta 2$

Where the vector from point B' to point T is represented by V2, the operating angle s of the first axis S1 is obtained as follows.

$\theta s = \cos^{-1}(V1\cdot V2)/(|V1|\cdot|v2|) = \cos^{-1}(((xv1-XB')\cdot(XT-XB')+(yv1-YB')\cdot(YT-YB')+(zv1-ZB')\cdot(ZT-ZB'))/BT)$ Then, the operating angle θt of the third axis S3 is given by $\theta t = ZR - \theta s$ Once the coordinates S (XS, YS, ZS) of the upper substrate 13 on the first axis S1 is obtained as described above, the length of each of the expansion actuators 15A, 15B, 15C can be then obtained.

Figure 12:
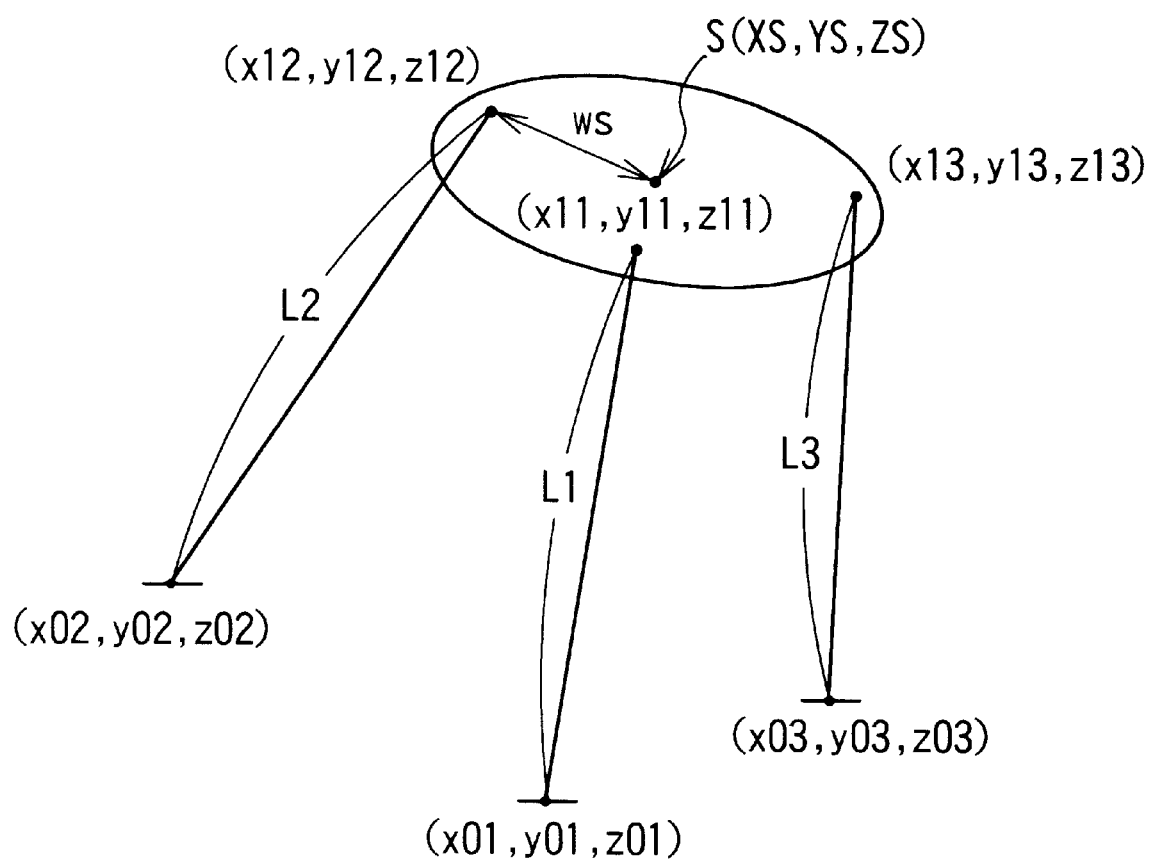
FIG. 12 is a view showing the relationships among coordinate points used for calculating the lengths of expansion actuators.

Initially, as shown in FIG. 12, the coordinates of pivotal points of the three expansion actuators 15A, 15B, 15C on the side of the lower substrate 12 are represented by (x01 y01, z01), (x02, y02, z02), and (x03, y03, z03), respectively, and the coordinates of their pivotal points (ball joints) on the side of the upper substrate 13 are presented by (x11, y11, z11), (x12, y12, z12), and (x13, y13, z13), respectively. Also, L1, L2, L3 represent the distances between the pivotal points of the respective expansion actuators, and ws represents the distance between point S and each of the upper pivotal points.

Where θ1 is the angle of inclination of the rotation inhibiting mechanism in the X-axis direction, and θ2 is the angle of its inclination in the Y-axis direction, the relationships as follows are established.

$\tan \theta 1 = XS/ZS$ $\tan \theta 2 = YS/ZS$

Thus, the coordinates of the upper pivotal point of the expansion actuator 15A are given by $x11=XS$ $x11=YS-ws \cdot \cos \theta2$ $z11=ZS+ws \cdot \sin \theta2$ The coordinates of the upper pivotal point of the expansion actuator 15B are given by $x12=XS-ws \cdot \cos 30° \cdot \cos \theta1$ $y12=YS+ws \cdot \sin 30° \cdot \cos \theta2$ $z12=ZS-ws \cdot \sin 30° \cdot \sin \theta2+ws \cdot \cos 30° \cdot \sin \theta1$ The coordinates of the upper pivotal point of the expansion actuator 15C are given by $x13=XS+ws \cdot \cos 30° \cdot \cos \theta1$ $y13=YS+ws \cdot \sin 30° \cdot \cos \theta2$ $z13=ZS-ws \cdot \sin 30° \cdot \sin \theta2-ws \cdot \cos 30° \cdot \sin \theta1$ Accordingly, the lengths of the respective expansion actuators can be obtained based on the relationship as follows:

$L1^2=(x11-x01)^2+(y11-y01)^2+(z11-z01)^2$ $L2^2=(x12-x02)^2+(y12-y02)^2+(z12-z02)^2$ $L3^2=(x13-x03)^2+(y13-y03)^2+(z13-z03)^2$

In the above manner, the amounts of expansion of the expansion actuators, and the amounts of rotation of the three-axis rotary unit about the three axes can be converted into each other.

Figure 13A:
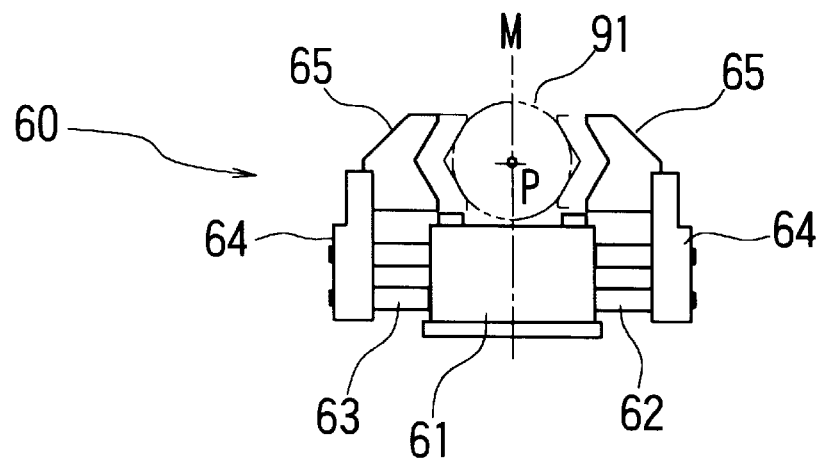
FIG. 13A is a front view showing one example of a clamp.
Figure 13B:
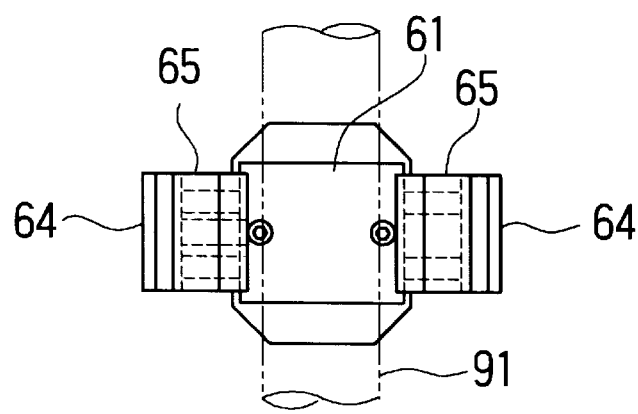
FIG. 13B is a plan view showing one example of a clamp.

FIG. 13A and FIG. 13B are front view and plan view, respectively, showing the structure of an automatic alignment type clamp that is used as the clamp 60. An air cylinder is formed in a base block 61, and piston rods 62, 63 are inserted into the air cylinder to extend in the left and right directions, such that their distal ends are fixed by holders 64, 64. The base block 61 is attached onto the third plate 40 of the three-axis rotary unit, and the air cylinder is connected to an air supply source (not illustrated).

Claws 65 are attached to the respective holders 64. By controlling the air pressure supplied to the air cylinder, the claws 65 are adapted to sandwich and hold the pipe 91 of the exhaust pipe therebetween as indicated by virtual lines in FIG. 13A, or release the pipe 91 as indicated by solid lines. When the pipe 91 is sandwiched by and between the claws 65, the left and right holders 64 move toward each other on the same stroke, through a linkage that is not illustrated, so that the claws 65 always hold the pipe on a center line M that passes through the clamp center P.

Figure 14:
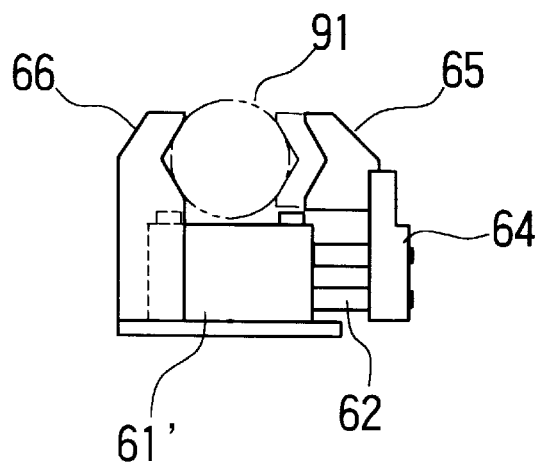
FIG. 14 is a view showing a modified example of a clamp.

A modified example of clamp is illustrated in FIG. 14. In this example, a piston rod 62 extends from only one side of a base block 61', and a holder 64 is fixed to the distal end of the piston rod 62, while a receiving claw 66 is fixed to the other side of the base block 61'.

By supplying the air pressure to the air cylinder formed in the base block 61', a claw 65 attached to the holder 64 presses the pipe 91 against the receiving claw 66, and thus hold the pipe 91. In this case, too, the operating position of the clamp can be easily determined since the position of the receiving claw 66 is fixed.

Figure 15A:
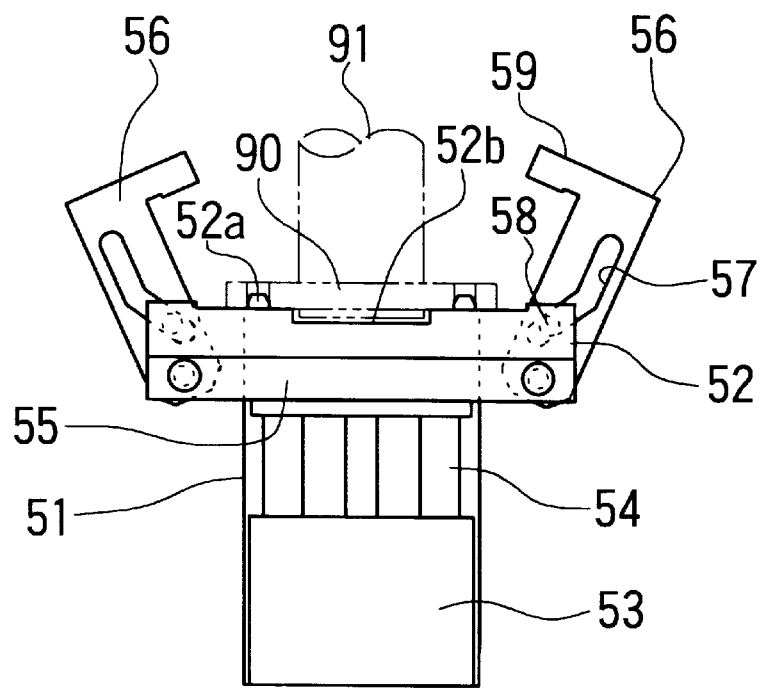
FIG. 15A is a view showing a further example of a clamp in a releasing state.
Figure 15B:
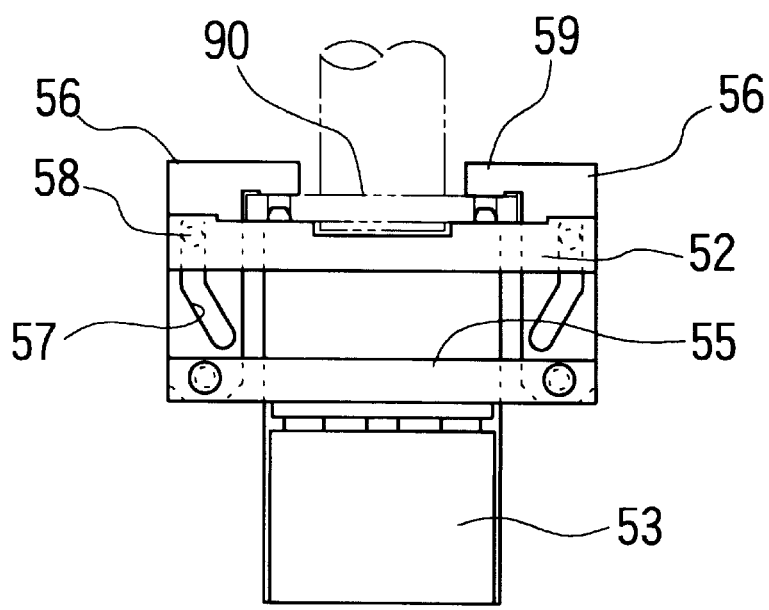
FIG. 15B is a view showing a further example of a clamp in holding state.

FIG. 15A and FIG. 15B show a further example of clamp that may be used as the clamp 50 for holding a flange that is welded to an end portion of an exhaust pipe, wherein FIG. 15A shows the releasing state of the clamp, and FIG. 15B shows its holding state.

An abutting block 52 is provided at the front end of a stationary base 51, and a base block 53 in which an air cylinder is formed is provided on the side of the rear end of the base 51. A movable bar 55 is fixed to a piston rod 54 that is inserted into the air cylinder, such that the bar 55 is movable back and forth between the abutting block 52 and the base block 53. Holding levers 56 are supported at their rear ends by the left and right end portions of the movable bar 55.

A cam hole 57 is formed in each of the holding levers 56 in its longitudinal direction, and pins 58 provided on the left and right end portions of the abutting block 52 engage with the corresponding cam holes 57. Each of the holding levers 56 includes an L-shaped retainer portion 59 at its front end.

The cam hole 57 extends substantially straight in the front end portion of the holding lever 56, and deflects inwards in the rear end portion of the lever 56. When the piston rod 54 is advanced so as to move the movable bar 55 toward the abutting block 52 as shown in FIG. 15A, the holding levers 56 are brought into the open state in which the front ends of the levers 56 are located away from the pipe 91. In this condition, the flange 90 is set on the abutting block 52, and the pipe 91 is inserted into a hole of the flange. The abutting block 52 is provided with pins 52a that match bolt holes of the flange 90, which pins 52a are used for positioning the flange. Also, a recess 52b is formed in the abutting block 52 so as to define the amount of insertion of the pipe 91.

When the piston rod 54 is retracted, and the movable bar 55 moves toward the base block 53, the front end portions of the holding levers 56 rotate inward and move backward, as shown in FIG. 15B, so as to press the flange 90 against the abutting block 52.

In the present embodiment as described above, a plurality of locational holding devices 10A, 10B, 10C, 10D are mounted on the base, and the clamps 50, 60 and 70 that are selected depending upon the part materials of the exhaust pipe are attached to the holding devices.

In a typical example of its application, the amounts of expansion of the expansion actuators 15 and the amounts of rotation of the three-axis rotary unit 30 about three axis are set through teaching or data input, according to the holding positions and the types of parts to be held. Data relating to these amounts of expansion and rotation are then stored for the next use.

Figure 16:
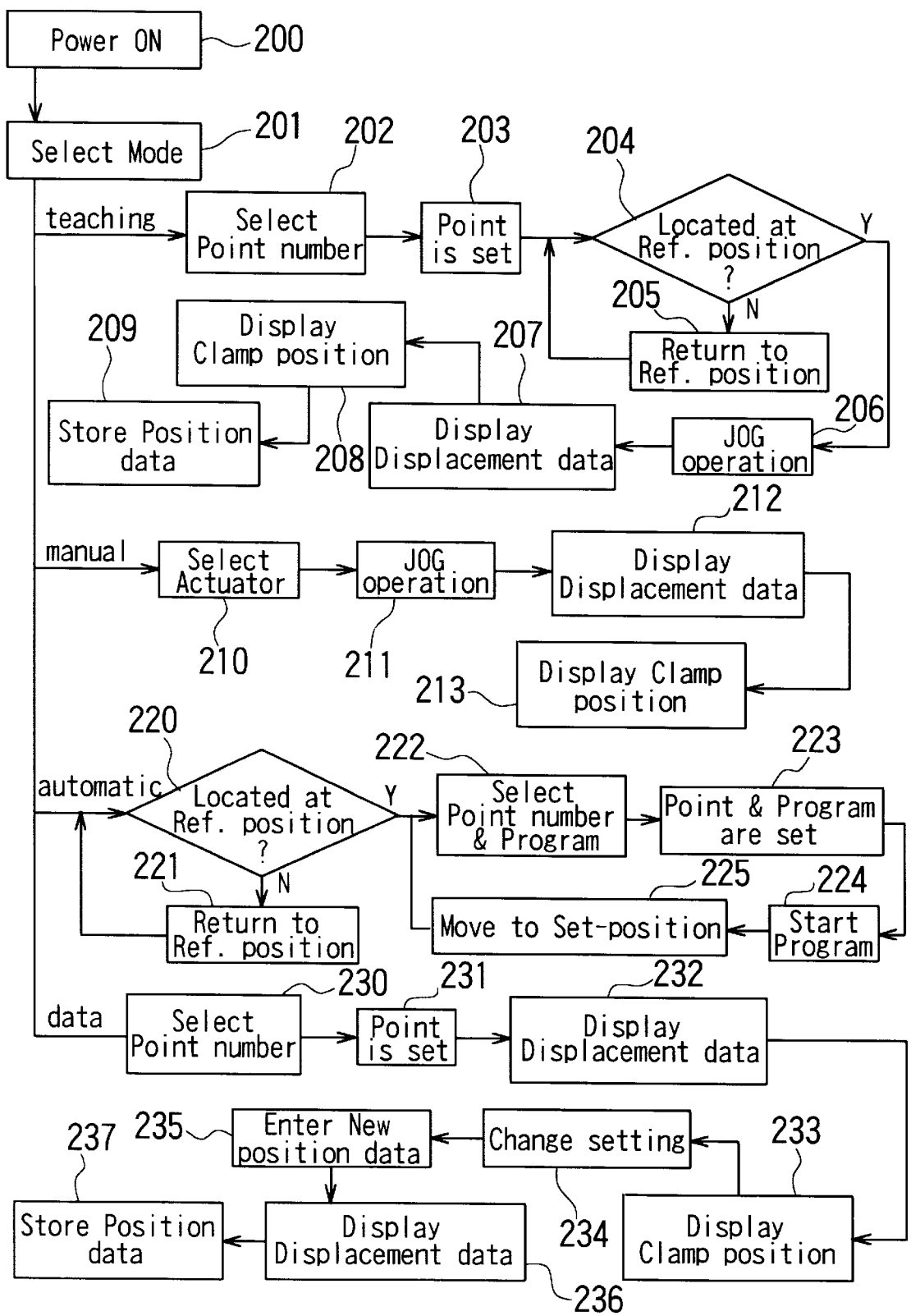
FIG. 16 is a flowchart showing the operations in different modes in which the locational holding device is controlled.

FIG. 16 is a flowchart showing operations of the control device 4 in different modes, for controlling the locational holding devices 10.

If a power supply of the control device 4 is turned on in step 200, step 201 is executed to select one of four modes, i.e., "teaching", "manual", "automatic" and "data". In this step, these four modes are displayed on the display 8, and the operator selects one of these modes, and enters the selected mode through the keyboard 7.

When "teaching" mode is selected, the control flow goes to step 202, to select the point number of the position that is to be set in the following steps. The point number may be selected from the range of 1 to 100, for example.

If the point number is selected, and the selection is confirmed and set in step S203, step 204 is executed to check if each of the expansion actuators 15 and three axes of the three-axis rotary unit 30 is located at its original position or not, namely, if its reference position has been confirmed or not. If any one of the expansion actuators and the three axes is not located at its original position, step 205 is executed to return it to the original, or reference position.

If all of the expansion actuators 15 and three axes of the three-axis rotary unit 30 have been located at their reference positions, the control flow goes to step 206 in which the JOG lever 9 is operated so as to move and position the clamps.

In step 207, displacement data that consist of the amounts of expansion of the respective expansion actuators 15 and the amounts of rotation of the three axes of the three-axis rotary unit 30 are displayed on the display 8.

In step 208, data of the coordinates of the current position of the clamp portion, namely, the position coordinates (X, Y, Z) of the clamp center P and the angle (AR, BR) of the clamp mounting plate (third plate 40), are displayed on the display 8.

The data displayed in steps 207 and 208 may appear alternately on the display 8 by switching operations, or the like.

If an execute key on the keyboard 7 is pressed in step 209, the position coordinate data are stored in the internal memory 46 as data associated with the point number set in step 203.

If "manual" mode is selected in step 201, the control flow goes to step 210 to select one or more expansion actuator(s) 15 to be expanded or contracted, or an axis or axes of the three-axis rotary unit 30 to be rotated. While all of the actuators and axes may be selected, a particular axis or a particular expansion actuator may be selected so that only the selected axis or actuator is moved.

Step 210 is followed by step 211 in which the JOG lever 9 is operated so as to move and position the clamp. In step 212, displacement data that consist of the amounts of expansion of the respective expansion actuators 15 and the amounts of rotation of the three axes of the three-axis rotary unit 30 as a result of the operation of the JOG lever 9 are displayed on the display 8. In step 213, coordinate data of the current position of the clamp is displayed on the display 8. This makes it possible to move the clamp to the desired position and posture, while confirming the display data on the display 8.

Next, "automatic" mode is selected only when position coordinate data are stored in the internal memory 46 in the above-described "teaching" mode or "data" mode as described later.

If the "automatic" mode is selected in step 201, the control flow goes to step 220 to check if the expansion actuators 15 and the three axes of the three-axis rotary unit 30 are located at their original positions. If any one of the expansion actuators and the three axes is not located at its original position, step 221 is executed to return it to the original or reference position.

After all of the expansion actuators 15 and the axes of the three-axis rotary unit 30 have been located at the reference positions, step 222 is executed to select the point number and the program number. Here, a plurality of programs are prepared that correspond to different types and sizes of clamps to be attached to the locational holding devices 10, and other parameters.

If the point number and program number are confirmed and set in step 223, step 224 is executed to start the selected program. Step 225 is then executed to calculate the displacements of the expansion actuators and three-axis rotary unit that are required for obtaining the position coordinates set for the selected point number, and drive the respective motors according to the calculated displacements, so as to move the actuators and rotary unit to the set positions. The control flow then returns to step 222, to allow the operator to select the point number and program number for the next locational holding device.

In "data" mode, position data for each point is confirmed and written into the memory.

Initially, if the "data" mode is selected in step 201, the control flow goes to step 230 to select the point number of the position that is to be set in the following steps. Once the point number is selected, and the selection is conformed and set in step 231, the current displacement data for each of the expansion actuators 15 and the three axes of the three-axis rotary unit 30 is displayed on the display 8, and its position coordinate data is displayed in step 233. The displacement data and position coordinate data may be displayed alternately by switching, or other method.

If a command to change setting is entered through the keyboard 7 in step 234, the control device 4 is placed in the state that permits input of data, and step 235 is executed to enter new position coordinate data. In step 236, displacement data for obtaining the new position coordinates is displayed on the display 8.

Finally, if an execute key on the keyboard 7 is pressed in step 237, the above position coordinate data is stored in the internal memory 46 as data associated with the point number set in step 230.

While the main function of the jig, namely, holding and fixing components parts that constitute an exhaust pipe, has been explained in the illustrated embodiment, the jig is not merely used for holding and fixing parts, but may be used to perform other functions. For example, the parts or assembled articles may be transported into or out of an assembly line, by releasing some of the clamps, and driving the expansion actuators 15 and the three-axis rotary unit 30 while keeping a particular clamp or clamps in the holding state. If the apparatus is programmed in advance, the jig can be instantly set up or placed in position, thus making it easy to manufacture different types of assemblies in the same assembly line.

The data stored in the "teaching" or "data" mode as described above may be stored in various types of storage media, other than the internal memory 46.

In the illustrated embodiment, the clamp is attached to the locational holding device 10 mounted on the base 2 and including the tripod robot 11 and the three-axis rotary unit 30, and the locational holding device 10 is controlled so as to set the clamp to the desired position and posture.

Where numerous different types of exhaust pipes are assembled for different types or versions of vehicles, therefore, there is no need to replace one jig by another jig used exclusively for the exhaust pipe to be assembled next. Thus, the operator is free from heavy work required for replacement of the jigs, and setup of the jig can be accomplished in a shortened time. Also, the storage space for jigs that are to be stored for spare parts can be advantageously reduced.

When the expansion actuator 15 of the locational holding device 10 is expanded or contracted so as to move the clamp, the control device 4 keeps the posture of the clamp constant, and therefore "teaching" can be easily performed by gauging or other method. Furthermore, position coordinate data are displayed, and therefore the set position can be confirmed with high accuracy.

In addition, the position coordinate data set by teaching and corresponding displacement data for each axis are stored in a memory, and these data may be used for readily setting up a jig in which a clamp is located at a required or desired holding position.

While a plurality of locational holding devices 10 are mounted on the horizontal base 2 in the illustrated embodiment, the present invention is not limited to this arrangement, but a plurality of locational holding device may be located on a vertical base.

While the jig of the illustrated embodiment is used for holding parts of an exhaust pipe, the object to be held by the jig is not particularly limited. Also, only one locational holding device may be mounted on a base, depending upon a part to be held by the jig.

While stepping motors are used as the drive motors 18 of the expansion actuators and control motors 33, 37, 42 of the three-axis rotary unit, other types of motors, such as servo motors, may be used.

As described above, according to the present invention, the clamp is attached to the locational holding device having three expansion actuators, and the position of the clamp may be changed by changing the length (or displacement) of each of the expansion actuators according to a command from the control device. Since the position of the clamp can be changed as desired, a suitable number of locational holding devices may be mounted on a base, with their clamps set in desired positions, so as to deal with a plurality of objects to be held. This eliminates a need to replace a jig that is used exclusively for the current object by a new one used exclusively for the next object to be held. Thus, the operator is free from heavy work required for replacement of the jigs, and setup of the jigs can be accomplished in a shortened time. Also, the storage space for the jigs to be stored for spare parts can be advantageously reduced.

The expansion actuators are located between the lower substrate and the upper substrate, and the rotation inhibiting mechanism is also provided between these substrates. With this arrangement, the position of the clamp can be controlled by changing the amounts of extension of the actuators. Further, the three-axis rotary unit is attached so as to control the angle of the clamp as desired.

The expansion actuators of the tripod robot and the three-axis rotary unit may be respectively driven by means of stepping motors or servo motors. By controlling the angles of rotation of the stepping motors or servo motors, the actuators and three-axis rotary unit can be easily moved to achieve respective displacements calculated by the computing means with high reliability.

While the tripod robot is operated to move the clamp or after the movement, the three-axis rotary unit is controlled so as to keep the posture of the clamp constant. With this arrangement, teaching operations can be easily performed. Also, the displacement data or related position data as a result of teaching are automatically stored in storage means, and therefore the next setting of displacement or position can accomplished only by selecting appropriate one from the stored data.

The current displacement data or related position data of the tripod robot or three-axis rotary unit are displayed on a display, which enables the user to confirm setting conditions in the teaching mode, for example, with high accuracy.

What is claimed is:

1. A general-purpose jig comprising:
   a base;
   a locational holding device mounted on said base, and comprising a tripod robot that includes three expansion actuators; and
   a clamp attached to said locational holding device;
   wherein a position of said clamp can be changed by changing a length of each of said expansion actuators, depending upon an object to be held, according to a command from a control device;
   wherein said tripod robot further includes a lower substrate, an upper substrate, and a rotation inhibiting mechanism provided between said lower substrate and said upper substrate for inhibiting torsional rotation of the lower and upper substrates relative to each other, said three expansion actuators being located between said lower substrate and said upper substrate; and
   wherein said rotation inhibiting mechanism comprises two parallel sleeves that are connected to said lower substrate with two degrees of freedom and spaced apart from each other by a predetermined distance, and two slide rods that are fixed to said upper substrate and extend in parallel with each other, such that the two slide rods are guided by said two parallel sleeves, respectively.

2. A general-purpose jig according to claim 1,
   wherein said locational holding device further comprises a three-axis rotary unit comprising elements that can be rotated about three axes that intersect at right angles with each other, said three-axis rotary unit attached to said upper substrate of said tripod robot and operating according to a command from said control device.

3. A general-purpose jig according to claim 2, wherein said expansion actuators of said tripod robot and said three-axis rotary unit are driven by stepping motors or servo motors, and
   wherein said control device comprises computing means for calculating a displacement of each of the expansions actuators and said three-axis rotary unit based on the position of the clamp, and controls an angle of rotation of a corresponding one of the stepping motors or servo motors, according to said displacement.

4. A general-purpose jig according to clam 3, wherein said control device controls said three-axis rotary unit while the tripod robot is being operated to move the clamp or after movement of the clamp, so that the clamp maintains a predetermined posture.

5. A general-purpose jig according to claim 3, wherein said control device further comprises manual operating means for operating the tripod robot and the three-axis rotary unit as desired, and storage means, and
   wherein said computing means calculates displacement data or related position data of the tripod robot or the three-axis rotary unit that is operated by said manual operating means, and stores the displacement data or related position data into the storage means.

6. A general-purpose jig according to claim 5, wherein the control device comprises a display on which the current displacement data or related position data of the tripod robot or the three-axis rotary unit is displayed.

7. A general-purpose jig according to claim 2,
   wherein said expansion actuators of said tripod robot and said three-axis rotary unit are driven by stepping motors or servo motors; and
   said control device comprises computing means for calculating a displacement of each of the expansions actuators and said three-axis rotary unit based on the position of the clamp, and controls an angle of rotation of a corresponding one of the stepping motors or servo motors, according to said displacement.

8. A general-purpose jig according to claim 7,
   wherein said control device controls said three-axis rotary unit while the tripod robot is being operated to move the clamp or after movement of the clamp, so that the clamp maintains a predetermined posture.

9. A general-purpose jig according to claim 7
   wherein said control device further comprises manual operating means for operating the tripod robot and the three-axis rotary unit as desired, and storage means; and said computing means calculates displacement data or related position data of the tripod robot or the three-axis rotary unit that is operated by said manual operating means, and stores the displacement data or related position data into the storage means.

10. A general-purpose jig according to claim 4, wherein said control device further comprises manual operating means for operating the tripod robot and the three-axis rotary unit as desired, and storage means; and said computing means calculates displacement data or related position data of the tripod robot or the three-axis rotary unit that is operated by said manual operating means, and stores the displacement data or related position data into the storage means.

11. A general-purpose jig according to claim 8, wherein said control device further comprises manual operating means for operating the tripod robot and the three-axis rotary unit as desired, and storage means; and wherein said computing means calculates displacement data or related position data of the tripod robot or the three-axis rotary unit that is operated by said manual operating means, and stores the displacement data or related position data into the storage means.

12. A general-purpose jig according to claim 9, wherein the control device comprises a display on which the current displacement data or related position data of the tripod robot or the three-axis rotary unit is displayed.

13. A general-purpose jig according to claim 10, wherein the control device comprises a display on which the current displacement data or related position data of the tripod robot or the three-axis rotary unit is displayed.

14. A general-purpose jig according to claim 11, wherein the control device comprises a display on which the current displacement data or related position data of the tripod robot or the three-axis rotary unit is displayed.

* * * * *